(12) United States Patent
Laitinen

(10) Patent No.: US 8,852,794 B2
(45) Date of Patent: Oct. 7, 2014

(54) ELECTRIC VEHICLE BATTERY CASE

(75) Inventor: Ernest W. Laitinen, Canby, OR (US)

(73) Assignee: Battchange, LLC, Canby, OR (US)

( * ) Notice: Subject to any disclaimer, the term of this patent is extended or adjusted under 35 U.S.C. 154(b) by 200 days.

(21) Appl. No.: 13/353,060

(22) Filed: Jan. 18, 2012

(65) Prior Publication Data

US 2013/0183561 A1    Jul. 18, 2013

(51) Int. Cl.
*H01M 2/00*    (2006.01)
*B60K 1/04*    (2006.01)
*H01M 2/10*    (2006.01)

(52) U.S. Cl.
CPC .............. *H01M 2/1083* (2013.01); *B60K 1/04* (2013.01)
USPC ........... 429/163; 429/148; 429/149; 429/153; 429/154; 429/159; 429/167; 429/168; 429/176

(58) Field of Classification Search
CPC .......... B29C 67/00; B60K 2001/0461; B60K 2001/0494; B60L 11/1816; B60L 11/1822; B60L 11/1877; B60L 11/1879; B60R 16/04; H01M 2/1083; H01M 2/1016; Y02E 60/12; Y02T 10/7005; Y02T 10/7072; Y02T 90/121; Y02T 90/124; Y02T 90/14
USPC ......... 429/136, 148–149, 153–154, 159, 163, 429/167–168, 176
See application file for complete search history.

(56) References Cited

U.S. PATENT DOCUMENTS

| | | | |
|---|---|---|---|
| 3,930,552 A | 1/1976 | Kunkle et al. | |
| 4,216,839 A * | 8/1980 | Gould et al. | 180/65.1 |
| 5,760,569 A * | 6/1998 | Chase, Jr. | 320/104 |
| 6,003,924 A | 12/1999 | Nicol et al. | |
| 7,712,563 B2 | 5/2010 | Niebuhr | |
| 7,732,092 B2 | 6/2010 | Oh | |
| 7,948,207 B2 | 5/2011 | Scheucher | |
| 2002/0155348 A1* | 10/2002 | Gitto | 429/163 |
| 2008/0118828 A1* | 5/2008 | Brennfoerder | 429/160 |
| 2009/0325058 A1* | 12/2009 | Katayama et al. | 429/142 |

OTHER PUBLICATIONS

Storeaway, New Vehicle Storage System!, Canby, OR, 4 pages, Dec. 21, 1999.
Squatriglia, "Better Place Unveils an Electric Car Battery Swap Station," Autopia, Planes, Trains, Automobiles and the Future of Transportation, Categories; EVs and Hybrids, May 13, 2009, 20 pages.

* cited by examiner

*Primary Examiner* — Patrick Ryan
*Assistant Examiner* — Ben Lewis
(74) *Attorney, Agent, or Firm* — Berkeley Law & Technology Group, LLP

(57) ABSTRACT

Subject matter disclosed herein relates to an apparatus for a battery system for electric vehicles and, more particularly, to removable modular batteries and a battery case to store the batteries.

20 Claims, 3 Drawing Sheets

ELECTRIC VEHICLE BATTERY CASE

BACKGROUND

1. Field

Subject matter disclosed herein relates to an apparatus for a battery system for electric vehicles and, more particularly, to removable modular batteries and a battery case to store the batteries.

2. Information

Hybrid electric vehicles that employ battery power together with power from an engine-driven electrical generator, and electric vehicles which may rely entirely on batteries for power are becoming more common. Batteries for hybrid or all-electric vehicles tend to be heavy assemblies that may involve specialized equipment for installation or removal from a vehicle. For example, size or weight of vehicle batteries may present difficulties for an individual to exchange a discharged or to install fresh batteries.

BRIEF DESCRIPTION OF THE FIGURES

Non-limiting or non-exhaustive embodiments will be described with reference to the following figures, wherein like reference numerals refer to like parts throughout various figures unless otherwise specified.

DETAILED DESCRIPTION

Figure 1:
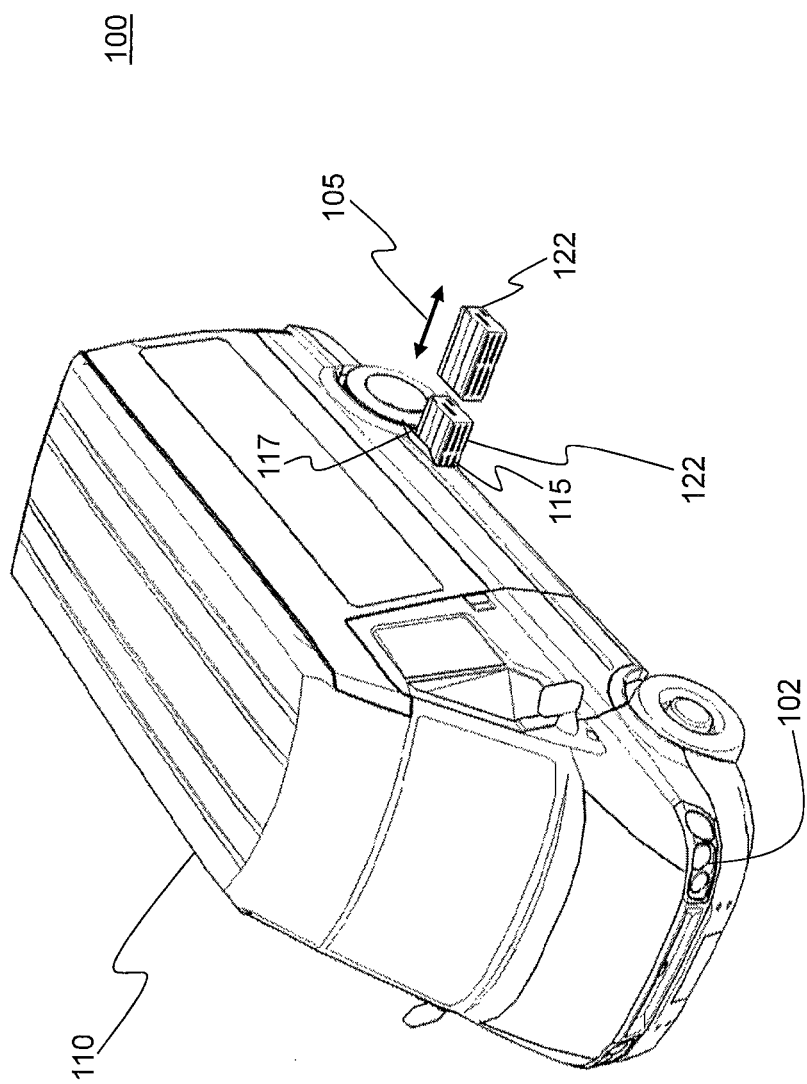
FIG. 1 shows a vehicle that includes a battery case, according to an embodiment.

Reference throughout this specification to "one embodiment" or "an embodiment" means that a particular feature, structure, or characteristic described in connection with the embodiment is included in at least one embodiment of claimed subject matter. Thus, appearances of phrases such as "in one embodiment" or "an embodiment" in various places throughout this specification are not necessarily all referring to the same embodiment. Furthermore, particular features, structures, or characteristics may be combined in one or more embodiments.

Reference is made in the following detailed description to accompanying drawings, which form a part hereof. It should also be noted that directions and/or references, for example, up, down, top, bottom, and so on, may be used to facilitate discussion of drawings and/or are not intended to restrict application of claimed subject matter. It is understood that these terms do not necessarily refer to a direction defined by gravity or any other particular orientation. Instead, these terms are merely used to identify one portion versus another portion. Therefore, the following detailed description is not to be taken to limit the scope of claimed subject matter and/or equivalents.

Batteries for hybrid or all-electric vehicles may present a number of difficulties which may, for example, reduce potential marketability of these vehicles. For example, vehicle batteries may comprise relatively heavy assemblies having size or weight leading to physically unsafe conditions for manually handling the batteries under Occupational Safety and Health Administration (OSHA) handling guidelines or standards. Accordingly, relatively expensive mechanical equipment may be involved in installation, removal, or maintenance of vehicle batteries.

In addition, imbedding vehicle batteries within a body of a vehicle may lead to difficult or cumbersome processes for maintenance or safety inspections. Thus, for example, troublesome maintenance or safety inspections may be skipped from time to time. However, vehicle batteries not adequately inspected are known to have caused major vehicle fires. Also, some methods of recharging vehicle batteries may involve leaving the batteries in a vehicle because of the difficulty in handling the batteries. Recharging vehicle batteries left in a vehicle may lead to relatively long recharge-service times (e.g., a vehicle incapacitated for one or more hours) based, at least in part, on a cycle time of a method to recharge the batteries. On the other hand, fast-charge methods, which may be relatively expensive, may improve upon slower recharge methods, but may be significantly slower than a method of replacing spent batteries with freshly charged batteries. However, a heavy-single-module replacement system, which may have a relatively slow cycle time, may cost over $500,000 in capital equipment, for example. In comparison, gas or diesel power refill may be performed (e.g., at a gas station) in a few minutes.

In an embodiment, hybrid or all-electric vehicles may operate using a plurality of relatively heavy vehicle batteries. Throughout a life of a hybrid or all-electric vehicle, such vehicle batteries may be removed or replaced for charging, maintenance, inspection, retirement, and so on. Handling a large number of heavy vehicle batteries may lead to a cumbersome or physically harmful experience. Accordingly, a battery case to hold a plurality of vehicle batteries may include features to allow for relatively easy or fast removal or insertion. For example, a battery case may provide a benefit in that a vehicle need not be disassembled to remove or add vehicle batteries. In one implementation, a battery case may be attached to a portion of a hybrid or all-electric vehicle so that batteries stored in the battery case may supply electric power to the vehicle. In another implementation, a plurality of battery cases may be stacked on a workbench or cart, for example, so that maintenance or charging may be performed on batteries stored in the battery cases.

In an embodiment, a vehicle battery case may be incorporated within a hybrid-powered vehicle or a non-gas-powered vehicle, such as an all-electric vehicle, for example. However, a vehicle battery case may also be incorporated within a gas-powered vehicle, and claimed subject matter is not limited in this respect.

In an embodiment, a battery case may include ridges (e.g., "slides") on which vehicle batteries may slide during insertion or removal of the batteries to or from the battery case. Ridges may comprise a material that allows for a relatively small amount of sliding friction between the ridges and vehicle batteries. In addition to reduced friction, ridges of a battery case may comprise a relatively small surface area on which vehicle batteries slide, compared to a surface area of a bottom of the battery case. Ridges having a relatively small amount of friction may be used in lieu of mechanical sliders or rollers that may include bearings, gears, shafts, and so on, for example. Accordingly, a battery case may comprise a relatively simple or easily manufacturable shape that need not use sliders or rollers to facilitate moving relatively heavy vehicle batteries, though sliders or rollers may be utilized in some embodiments.

Descriptions of some examples or embodiments may describe lifting, sliding, or moving relatively heavy vehicle batteries. Just to give a particular numeric example, relatively heavy batteries may have a weight over ten pounds, though claimed subject matter is not so limited. A relatively heavy battery may be considered easy to slide, for example, if a user need not use an entire gripped hand to initiate or slide a battery. Instead, if a battery is considered easy to slide, then a user may use merely a few fingers to pull or push the battery, for example. Of course, such details are merely examples, and claimed subject matter is not so limited.

In a particular embodiment, a vehicle battery case may comprise a housing at least partially enclosing a cavity to receive one or more vehicle batteries substantially along an axial direction of the cavity. An internal surface of a bottom portion of the housing may include one or more slides on which vehicle batteries may slide with relatively low sliding resistance (e.g., kinetic friction). In some implementations, however, internal surfaces of top or side portions of a housing may include one or more slides. Slides may comprise elongate ridges that extend upward and substantially in parallel to an axial direction of the battery case cavity. Slides may at least partially support weight of one or more vehicle batteries during sliding or storing of the batteries, though claimed subject matter is not necessarily so limited.

In one implementation, an elongate ridge may comprise a raised portion of an internal surface of housing material of a battery case. For example, a raised portion of an internal surface of housing material may have a shape that is at least partially convex with respect to a cavity of the housing. Portions of housing material may further include one or more channels having a shape that is at least partially concave with respect to the cavity of the housing.

In an embodiment, to allow for symbiotic use among a vehicle battery case and one or more vehicle batteries, external surfaces of the batteries may have a shape that corresponds to a shape of a cavity of the vehicle battery case. In particular, an external surface of a vehicle battery may include one or more features to correspond to a shape of an internal surface of a housing of a vehicle battery case. For example, an external surface of a vehicle battery may include one or more elongate battery ridges that may be sized or positioned to correspond to one or more channels on an internal surface of a housing of a vehicle battery case. A correspondence, for example, may comprise a male-female relationship between a raised portion of a vehicle battery and a channel of a vehicle battery case. In other embodiments, one or more ridges on a battery may correspond to one or more ridges in a cavity of a vehicle battery case in a male-male relationship, and claimed subject matter is not limited in this regard.

In an embodiment, a vehicle battery case may accommodate vehicle batteries that comply with any of a number of manufacturing specifications or standards. For example a battery standard may specify a particular size, shape, or other physical feature for a vehicle battery. In one implementation, a battery standard may specify that vehicle batteries may be stackable or fit closely end-to-end, for example.

In an embodiment, vehicle batteries may operated with a cooling system to help maintain battery temperature below a particular level, for example. Accordingly, a vehicle battery case may include one or more duct inlets or outlets to allow for flow of a coolant, such as air, for example.

Figure 2:
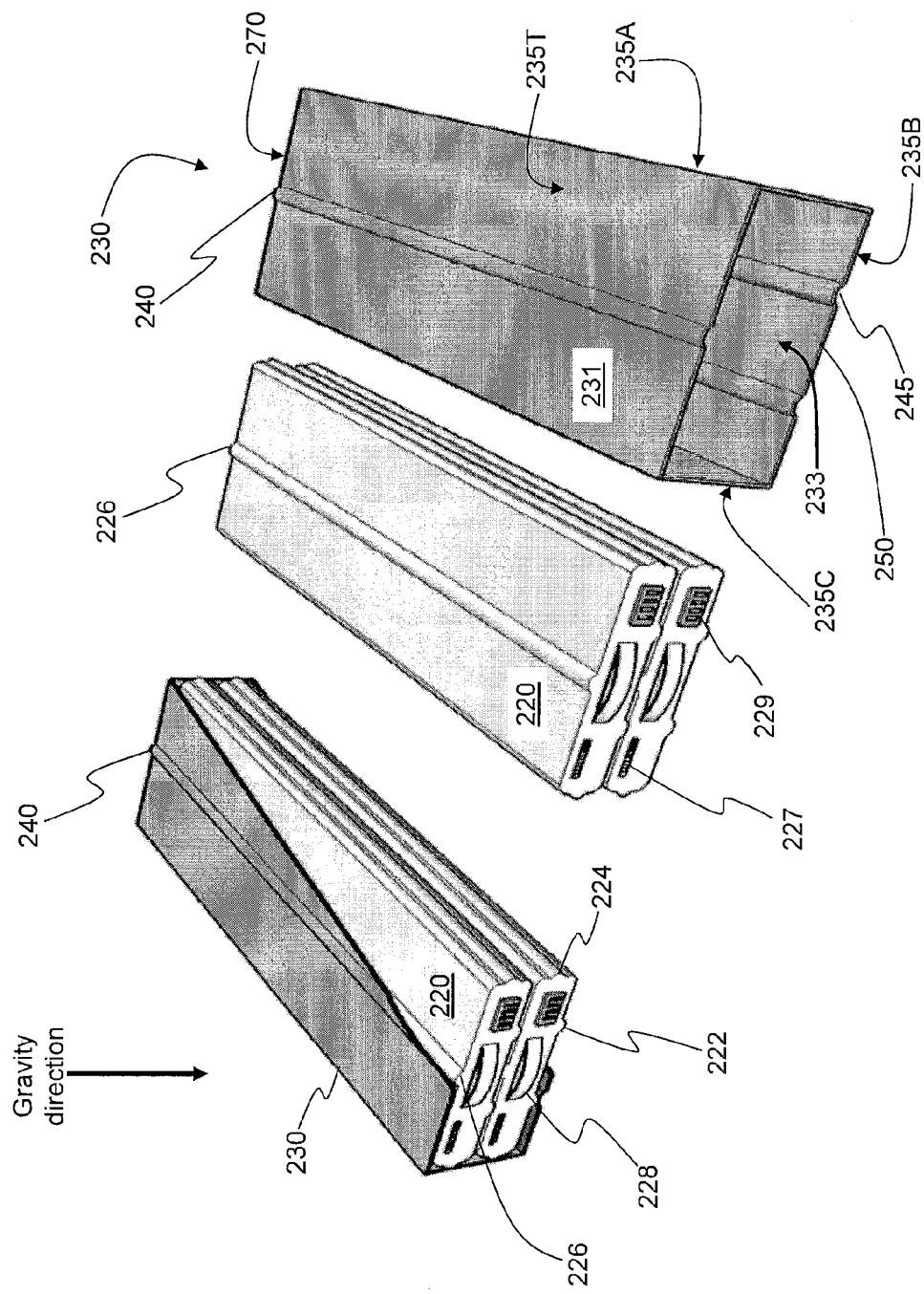
FIG. 2 includes perspective figures of vehicle batteries and a battery case, according to an embodiment.

FIG. 1 shows a vehicle example or embodiment, such as 110, that includes an attached battery case (not shown), such as battery case 230, shown in FIG. 2, according to an embodiment. Vehicle 110 may comprise any of a number of types of hybrid or all-electric vehicles, such as, but not limited to, an automobile, an aircraft, or a boat, for example. A battery case, which may be mounted or attached to an underside region of a vehicle, may hold one or more vehicle batteries 122 while being used as a power source for the vehicle. Alternatively, one or more vehicle batteries may merely be stored in a battery case and need not be used as a power source at times.

An attached battery case may include a front port 115 that may include a cover 117 that may be hinged. One or more vehicle batteries 122 may be inserted into or removed from a battery case, as indicated by arrow 105, for example. Inserting or removing batteries may be facilitated by one or more low-friction slides (e.g., shown in FIG. 2) disposed inside a cavity of a battery housing. Accordingly, one or more vehicle batteries 122 may be slid into or out from the cavity while weight of the vehicle battery is at least partially supported by the one or more low-friction slides.

In an embodiment, a vehicle battery may have a height or width substantially the same as that of a cavity of a battery case. However, a length of a vehicle battery may be less than that of a cavity of a battery case. Accordingly, multiple batteries may extend from a rear end to a front end of a battery case. In one implementation, one vehicle battery may be inserted into the cavity following another vehicle battery so that a plurality of batteries may be placed into the cavity of a battery case. For example, a second inserted battery following a first inserted battery may physically contact the first battery so that a user pushing on the second battery may impart a force on the first battery via the second battery. In one implementation, physical contact among two or more batteries may facilitate electrical contact among batteries. Sliding friction between the plurality of sliding batteries and the cavity of the battery case may be relatively low so that a user sliding several batteries together in the cavity need not experience significant resistance.

In another implementation, vehicle batteries may have a length approximately the same as a length of a cavity of a battery case. Accordingly, a single battery may extend approximately from a rear end to a front end of battery case. In yet another implementation, vehicle batteries may have a height substantially less than a height of a cavity of a battery case. Accordingly, multiple batteries may be placed or stacked upon one another inside the cavity. An example of such a situation is shown in FIG. 2, for example.

FIG. 2 includes perspective figures of vehicle batteries and a battery case, according to an embodiment. In particular, the figure on the left shows a cutaway view of a vehicle battery example or embodiment, such as 220, inserted in a cavity of a battery case 230. The figure in the center shows vehicle batteries 220. The figure on the right shows battery case 230 without batteries.

In a particular embodiment, a vehicle battery case 230 may comprise a housing 231 at least partially enclosing cavity 233 to receive one or more vehicle batteries 220 substantially along an axial direction of the cavity. A bottom portion 235B of housing 231 may include one or more slides 245 on which vehicle batteries 220 may slide with relatively low sliding resistance. In some implementations, however, top portion 235T or side portions 235 A, C of housing 231 may include one or more slides or channels, such as channel 240, for example. Slides may at least partially support weight of one or more vehicle batteries during sliding or storing of the batteries. For example, the direction of gravity with respect to vehicle battery case 230 in one particular embodiment is shown in FIG. 2.

As mentioned above, vehicle batteries 220 may have a length approximately the same as a length of a cavity 233 of battery case 230. Accordingly, a single battery may extend from a rear end 270 to a front end of battery case 230. In yet another implementation, vehicle batteries may have a height substantially less than an inside height of a cavity of a battery case. Accordingly, multiple batteries 220 may be placed or stacked upon one another inside cavity 233, for example.

In one embodiment, battery case 230 may include slides 245 on which battery 220 may be slid into or out of cavity 233. Between or among slides 245, one or more recessed portions 250 may comprise a portion of battery case 230 that need not contact batteries inserted in cavity 233, for example. In particular, if a direction of gravity is as shown in FIG. 2, then bottom portion 235B of battery case 230 may at least partially support a weight of vehicle batteries 220. Accordingly, it may be desirable to include slides 245 and recessed portions 250 to reduce area of contact between bottom portion 235B and batteries in cavity 233. Reduced area may lead to reduced frictional forces between or among batteries and surfaces in cavity 233, which may allow for greater ease with which a user may install or remove batteries from the cavity. In addition, slides may comprise a material having relatively low friction. For example, a polyethylene-type material may provide a relatively slippery surface on which (e.g., heavy) batteries may be relatively easily moved. Other materials, such as any of a number of types of plastics or metals, for example, may also be used as slide material or housing material, and claimed subject matter is not so limited. In a particular implementation, a coefficient of friction between one or more slides and one or more vehicle batteries may comprise a value less than about 0.20, for example.

Recessed portions 250 may provide a benefit in that dirt or other material may accumulate in recessed portions 250 where the dirt or material may be out of the way of a sliding vehicle battery. In other words, recessed portions 250 may provide a space where undesirable material may accumulate, thus helping to maintain cleanliness of slides 245, for example. Also, undesirable material accumulated in recessed portions 250 may be relatively easy to remove, thus allowing slides 245, areas surrounding slides 245, or recessed portions 250, for example, to be relatively easy to clean.

In an embodiment, a vehicle battery may have a shape that corresponds to a shape of a vehicle battery case. For example, vehicle battery 220 may include one or more raised battery portions, such as 222, 224, or 226. Raised portions may correspond to recessed portions of a vehicle battery case. For example, raised portion 226 may correspond to channel 240 of vehicle battery case 230. On the other hand, in another embodiment, raised battery portions may correspond to raised portions or slides of a vehicle battery case. For example, raised portions 222 may correspond to slides 245 of vehicle battery case 230. In one particular implementation, one or more raised portions 224 disposed on sides of battery 220 may provide bumpers to guide battery 220 during contact with sides 235A, C from time to time while battery 220 is slid into or out of cavity 233, for example. On the other hand, one or more raised portions 224 providing bumpers to contact sides 235A, C from time to time may be useful while battery 220 is stationary in cavity 233 but while vehicle battery case 230 is in motion with a moving vehicle (e.g., shaking or jostling motion). For example, raised portions 224 may be useful for holding battery 220 at least approximately in a particular position in cavity 233 during vehicle motion. Vehicle battery 220 may also include a handle that a user may use to pull or push battery 220 out of or into cavity 233, for example.

In an embodiment, a vehicle battery may comprise any number of electronic features, such as a charge-light indicator 227 or a plug 229, for example. Indicator 227 may include a battery condition indicator (e.g., charge level, temperature, and so on), for example. Plug 229 may be used to electrically connect one battery to another or to electrically connect one or more batteries to a vehicle electrical system 102, for example. In one implementation, rear end 270 may comprise an end-cap including openings for electrical cables to connect among one or more batteries and a vehicle electrical system. In another implementation, rear end 270 may comprise electrical plugs on an internal surface to receive connections of one or more batteries to connect among the one or more batteries and a vehicle electrical system. In yet another implementation, rear end 270 may comprise one or more openings (not shown) to accommodate inlet or outlet ducts for cooling vehicle batteries located in cavity 233. For example, air may flow through cavity 233 to cool batteries 220. Inlet or outlet ducts may be located in other portions of vehicle battery case 230, such as portions 235A, 235B, 235C, or 235T, for example. Of course, such details of a vehicle battery case or a vehicle battery are merely examples, and claimed subject matter is not so limited.

In an embodiment, a method of manufacturing vehicle battery case 230 may comprise forming housing 231 by extruding a polyethylene-type material into a shape that includes one or more slides 245, one or more channels 240, or any other feature that may be formed from an extrusion process, for example. In an alternative embodiment, a method of manufacturing vehicle battery case 230 may comprise forming housing 231 by molding a polyethylene-type material into a shape that includes one or more slides 245, one or more channels 240, or any other feature that may be formed from a molding process, for example.

Though other methods of manufacturing vehicle battery case 230 may be used, extruded or molded polyethylene-type material may lead to a housing 231 that is relatively strong, has relatively low friction with many other materials, is relatively resistant to acids, or is water resistant. For example, an extrusion or molding process may allow for a housing 231 that need not include seams. Extruded or molded polyethylene-type material may also allow for housing 231 that has a cross-sectional shape comprising any of a number of possibilities, such as rectangular, square, circular, oval, and so on. Of course, any of a number of cross-sectional shapes may be attained by any of a number of methods of manufacturing other than extrusion or molding, and claimed subject matter is not so limited.

Figure 3:
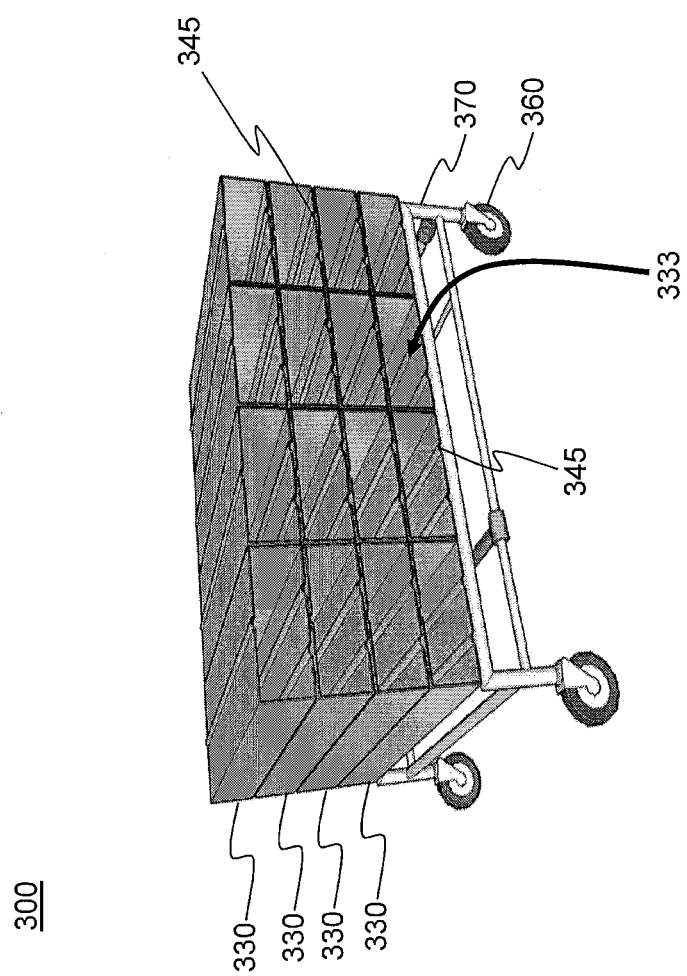
FIG. 3 shows a perspective figure of a moveable cart carrying multiple battery cases, according to an embodiment.

FIG. 3 shows a perspective figure of a moveable cart example or embodiment, such as 300, carrying multiple battery cases 330, according to an embodiment. Cart 300 may include castors 360 or a frame 370 having sufficient mechanical strength to support a relatively large amount of weight that may accompany a plurality of vehicle batteries, for example. Cart 300 may be useful for transporting or storing a plurality of vehicle batteries, which may be relatively heavy or cumbersome. Individual battery cases 330 may hold one or more vehicle batteries, whereas cart 300 may hold a plurality of battery cases 330. Accordingly, a relatively high number of vehicle batteries may be transported or stored by cart 300. For example, a plurality of vehicle batteries may be removed from a hybrid vehicle for inspection or electrical measurements and placed into cavities 333 of battery cases 330 on cart 300. Insertion or removal of vehicle batteries may be facilitated by one or more slides 345 included in individual battery cases 330 that may lead to a relatively low amount of friction while sliding the vehicle batteries into or out of cavity 333, for example. Of course, such details of a moveable cart are merely examples, and claimed subject matter is not so limited.

In the preceding description, various aspects of claimed subject matter have been described. For purposes of explanation, specific numbers, systems, or configurations may have been set forth to provide a thorough understanding of claimed subject matter. However, it should be apparent to one skilled in the art having the benefit of this disclosure that claimed subject matter may be practiced without those specific details. In other instances, features that would be understood by one of ordinary skill were omitted or simplified so as not to obscure claimed subject matter. While certain features have been illustrated or described herein, many modifications, substitutions, changes, or equivalents may now occur to those skilled in the art. It is, therefore, to be understood that the appended claims are intended to cover all such modifications or changes as fall within the true spirit of claimed subject matter.

What is claimed is:

1. A vehicle battery case comprising:
a housing at least partially enclosing a cavity to receive one or more vehicle batteries substantially along an axial direction of said cavity, an internal surface of said housing including one or more slides comprising elongate ridges that extend inward of said cavity and substantially in parallel to said axial direction of said cavity, wherein said elongate ridges comprise raised portions of said internal surface of said housing, wherein said raised portions have a shape that is at least partially convex with respect to said cavity, and said one or more slides to at least partially support weight of said one or more vehicle batteries.

2. The vehicle battery case of claim 1, wherein said housing is incorporated within a non-gas-powered vehicle.

3. The vehicle battery case of claim 2, wherein said non-gas-powered vehicle comprises a hybrid-powered vehicle or an all-electric vehicle.

4. The vehicle battery case of claim 1, wherein said internal surface of said housing includes one or more channels having a shape that is at least partially concave with respect to said cavity.

5. The vehicle battery case of claim 4, and further comprising said one or more vehicle batteries, wherein an external surface of said one or more vehicle batteries includes one or more elongate battery ridges corresponding to said one or more channels.

6. The vehicle battery case of claim 1, and further comprising said one or more vehicle batteries, wherein an external surface of said one or more vehicle batteries includes one or more elongate battery ridges corresponding to said one or more slides of said internal surface of said housing.

7. The vehicle battery case of claim 6, wherein said one or more elongate battery ridges extend substantially parallel to said axial direction of said cavity if said one or more vehicle batteries are received in said cavity.

8. The vehicle battery case of claim 1, wherein said housing comprises polyethylene.

9. The vehicle battery case of claim 1, and further comprising said one or more vehicle batteries, wherein said elongate ridges of said housing have a coefficient of friction with respect to an external surface of said one or more vehicle batteries so that said one or more vehicle batteries slide relatively easily on said elongate ridges.

10. The vehicle battery case of claim 1, and further comprising said one or more vehicle batteries, wherein a coefficient of friction between said one or more slides and said one or more vehicle batteries is less than approximately 0.20.

11. The vehicle battery case of claim 1, and further comprising said one or more vehicle batteries, wherein said housing further includes an electrical plug on said internal surface to connect to said one or more vehicle batteries.

12. The vehicle battery case of claim 1, and further comprising said one or more vehicle batteries, wherein an external shape of said one or more batteries corresponds at least approximately to a shape of an internal surface of said cavity of said housing.

13. A method comprising:
placing a vehicle battery onto one or more slides disposed inside a cavity of a battery housing; and
sliding said vehicle battery into said cavity while weight of said vehicle battery is at least partially supported by said one or more slides comprising elongated ridges that extend inward of said cavity and substantially in parallel to said axial direction of said cavity, wherein said elongate ridges comprise raised portions of said internal surface of said housing, wherein said raised portions have a shape that is at least partially convex with respect to said cavity.

14. The method of claim 13, further comprising sliding another vehicle battery behind said vehicle battery into said cavity.

15. The method of claim 13, further comprising connecting said vehicle battery to electrical cabling via a plug disposed on said battery housing.

16. The method of claim 15, wherein said electrical cabling comprises electrical cabling incorporated in a non-gas powered automobile, boat, or airplane.

17. A method of manufacturing a vehicle battery case, the method comprising:
forming a housing that at least partially encloses a cavity to receive one or more vehicle batteries substantially along an axial direction of said cavity, wherein said housing includes one or more slides comprising elongate ridges that extend inward of said cavity and substantially in parallel to said axial direction of said cavity, wherein said elongate ridges comprise raised portions of said internal surface of said housing, wherein said raised portions have a shape that is at least partially convex with respect to said cavity, and said one or more slides to at least partially support weight of said one or more vehicle batteries.

18. The method of claim 17, wherein said forming said housing comprises extruding polyethylene.

19. The method of claim 17, wherein said forming said housing comprises molding polyethylene.

20. A vehicle battery case for a non-gas powered vehicle, the vehicle battery case comprising:
a polyethylene material formed into a housing including sides and an end-cap;
a cavity formed as part of said case at least partially enclosed by said sides, a size of said cavity to receive two or more vehicle batteries; and
one or more slides comprising elongate ridges disposed on at least one of said sides inside said cavity, wherein an elevated portion of said one or more slides project inward of said housing cavity, wherein said one or more slides extend substantially parallel to an axial direction of said housing, wherein at least one of said one or more slides comprises a contoured portion of said polyethylene material on an internal surface of said housing, wherein said contoured portion has a shape that is at least partially convex with respect to said housing, and said one or more slides to at least partially support weight of said two or more vehicle batteries.

* * * * *